United States Patent [19]
Mattei et al.

[11] 4,173,366
[45] Nov. 6, 1979

[54] DEVICE FOR JETTISONING A LOAD IN TWO DIFFERENT WAYS

[75] Inventors: Jean-Pierre Mattei, La Varenne; Pierre F. Coutin, Paris, both of France

[73] Assignee: R. Alkan & Cie., Valenton, France

[21] Appl. No.: 865,152

[22] Filed: Dec. 28, 1977

[30] Foreign Application Priority Data

Jan. 4, 1977 [FR] France ............... 77 00061

[51] Int. Cl.² ............................................... B66C 1/28
[52] U.S. Cl. ............................ 294/83 R; 24/201 A; 24/230 AT
[58] Field of Search ............... 294/83 R, 83 A, 83 AB, 294/83 AE, 84, 86 R, 86 A, 88, 90, 106, 110 R, 113; 24/201 A, 230 AT, 230 AP, 230 AS, 230.5 R, 230.5 AD; 89/1.5 G; 244/137 R, 151 B

[56] References Cited

U.S. PATENT DOCUMENTS

| | | | |
|---|---|---|---|
| 3,154,337 | 10/1964 | Walker | 294/83 R X |
| 3,386,139 | 6/1968 | Rocchetti | 294/83 R X |
| 3,781,055 | 12/1973 | Keich et al. | 294/83 A |
| 3,830,186 | 8/1974 | Janssen et al. | 24/230 AT X |
| 4,019,771 | 4/1977 | Perez | 294/83 R |
| 4,032,020 | 6/1977 | Kato et al. | 294/86 A X |

FOREIGN PATENT DOCUMENTS

| | | | |
|---|---|---|---|
| 59955 | 11/1891 | Fed. Rep. of Germany | 24/230 AT |
| 2227211 | 12/1974 | France | 294/90 |
| 2303750 | 11/1976 | France | 294/110 R |

*Primary Examiner*—Johnny D. Cherry
*Attorney, Agent, or Firm*—William Anthony Drucker

[57] ABSTRACT

This device for jettisoning a load in two completely different ways comprises a rocker fulcrumed on a support rigid with the load, or spherical member formed integrally with the support, and a pair of opposed hooks fulcrumed to the structure from which the load is to be suspended, these hooks being responsive to separate control members, so that when only one hook is retracted the load can be released. If a spherical member is used, sliding cylindrical members having opposed ends formed with spherical concavities matching the curvature of the spherical member are provided, so that retracting one or both sliding members will release the load.

5 Claims, 7 Drawing Figures

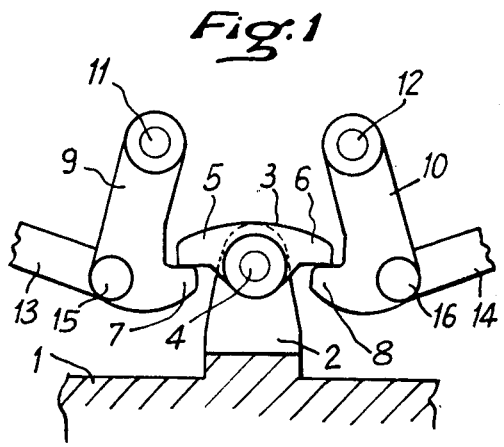
Fig. 1
Fig. 2
Fig. 3
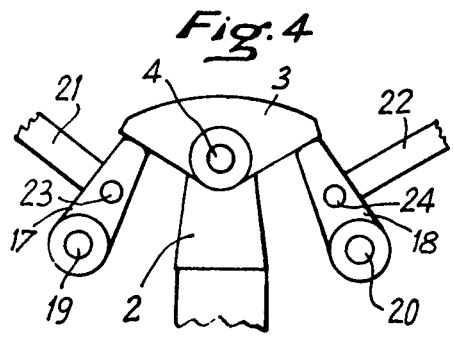
Fig. 4
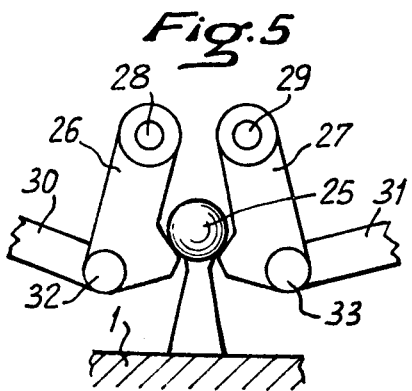
Fig. 5
Fig. 6
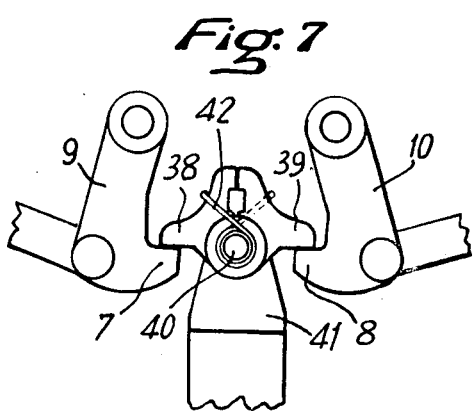
Fig. 7

DEVICE FOR JETTISONING A LOAD IN TWO DIFFERENT WAYS

BACKGROUND OF THE INVENTION

1. Field of the Invention

The present invention relates in general to means for releasing or jettisoning loads either in the field of aviation or simply in material handling and other industrial or commercial applications. More particularly, this invention is directed to provide improved means for releasing or jettisoning a load according to two completely different methods.

2. Description of the Prior Art

It is known that the devices proposed heretofore for releasing or jettisoning a load either from aircrafts or from handling machines differ widely from one type to another.

In the case of a load carried under an aircraft, it is generally required, in order to meet certain safety regulations, to duplicate the jettisoning means so that the load can be released by operating either of two devices (or possibly, of course, both of them).

DESCRIPTION OF THE INVENTION

It is the primary object of this invention to provide a twin-control jettisoning or release device comprising retaining members having completely different actions. For this purpose, the device is characterized essentially in that each retaining member rigid with the load engages in the load carrying position a pair of bearing members retractable independently of each other and responsive to separate control means, respectively, and disposed on each side of the retaining member whereby retracting only one of these bearing members by actuating either one of the two control means will cause the load to be jettisoned or released, even without retracting the other bearing member.

According to a first form of embodiment of the device, each load retaining member comprises a rocker fulcrumed intermediate its ends on an anchoring support secured to the load, and the two opposed arms of the rocker which are disposed on each side of its fulcrum are adapted to engage a pair of hooks or other bearing members adapted to be actuated independently of each other by the two control means, whereby retracting a single hook or bearing member will enable the rocker to tilt and be no longer retained by the single other hook or bearing member, even if the latter was not actuated in the release direction.

According to a modified form of embodiment of the invention, a spherical member is substituted for the above-mentioned rocker and this spherical member is advantageous in that it affords a certain degree of pivoting or alignment movement of the load in relation to the associated release device which may also consist of a pair of hooks or comprise two cylindrical members having concave part-spherical ends matching the curvature of the spherical member.

Furthermore, the rocker may be replaced by a pair of pivoting members urged into contact by a spring but adapted to pivot in opposite directions for suspending the load from a pair of bearing members of a double jettisoning device in the retaining position, whereas when the load is hung, retracting either one of the two bearing members of the double jettisoning device will enable the rocker consisting of the pair of pivoting members interconnected by a spring to pivot simultaneously in the direction as permitted by the withdrawal of a bearing member, thus causing the desired jettisoning.

The forms of embodiment broadly disclosed hereinabove should not be construed as limiting the present invention and it will readily occur to those conversant with the art that various equivalent arrangements may be contemplated without departing from the basic principles of the invention.

BRIEF DESCRIPTION OF THE DRAWING

FIG. 1 shows in elevational view a device of the rocker type having its two arms retained in the load hanging position by a pair of hooks controlled independently of each other;

FIGS. 2 and 3 illustrate the device in the jettisoning or release position when the two hooks are retracted simultaneously, and when only one hook is retracted, respectively;

FIG. 4 illustrates a rocker-type device having its arms retained by two equivalent means controlled independently of each other;

FIG. 5 is a similar view showing an equivalent device in which a spherical member is substituted for the rocker and adapted to be retained by a pair of independently controlled hooks;

FIG. 6 shows a device similar to the device of FIG. 5 but wherein the hooks are replaced by cylindrical members having concave part spherical ends corresponding to the curvature of the spherical member, and FIG. 7 illustrates a device in which the retaining member rigid with the load comprises two arms adapted to pivot in opposite directions but interconnected by a spring and permitting the suspension of the load from the jettisoning device previously cocked to a load hanging position.

DESCRIPTION OF THE PREFERRED EMBODIMENTS

In the form of embodiment illustrated in FIGS. 1 to 3, the load shown diagrammatically and partially at 1 comprises at its suspension point a support 2 on which a rocker 3 is fulcrumed intermediate its ends about a pin 4, the opposed arms 5, 6 of the rocker engaging, in the load-carrying position, (FIG. 1) the registering beaks 7, 8 of a pair of hooks 9, 10 adapted to pivot about pins 11, 12 and responsive to control rods 13, 14 pivotally connected to said hooks, respectively, by means of other pivot pins 15, 16.

It is clear that when the pair of hooks 9, 10 are actuated for retracting their beaks 7, 8 (FIG. 2) the load is released and therefore jettisoned. Moreover, if only one hook 9 or 10 is actuated (for instance hook 10 according to FIG. 3), the rocker 3 urged by the load 1 will pivot as shown in FIG. 3, thus jettisoning the load likewise. Each rod 13, 14 is actuated by an independent release device selected among those already known in the art and therefore neither shown nor described herein.

FIG. 4 shows a modified form of embodiment in which the hooks 9, 10 are replaced by bearing wedges 17, 18 adapted to pivot about pins 19, 20 and responsive to control rods 21, 22 associated with independent control means respectively and fulcrumed at 23, 24 to the bearing wedges 17, 18.

FIGS. 5 and 6 show two modified forms of embodiment of the invention in which the rocker 3 is replaced by a spherical retaining member 25 rigid with the load and retained in the hanging position either by a pair of hooks 26, 27 pivoted on pins 28, 29 responsive to control rods 30, 31 pivotally connected to the hooks at 32, 33 (FIG. 5), or by a pair of sliding cylindrical members 34, 35 of which the concave part-spherical ends 36, 37 match the curvature of the retaining spherical member 25 (FIG. 6). It is obvious that in either case retracting anyone of hooks 26, 27 or a single cylindrical member 34, 35 will release the load.

In the modified form of embodiment illustrated in FIG. 7, the rocker 3 of FIGS. 1 to 4 is replaced by a set of two separate arms 38, 39 adapted to pivot on a pin 40 carried by a support 41 rigid with the load 1, but said arms are urged against each other by a spring 42 in order to act somewhat like a rocker. In the carrier position illustrated, these arms 38, 39 are located under corresponding beaks 7, 8 of a pair of opposed hooks 9, 10 similar to those shown in FIGS. 1 to 3. It is also clear in this case that retracting even a single hook 9, 10 will permit the tilting of the rocker assembly comprising the pair of arms 38, 39 assembled by spring 42, thus releasing therefore the load 1, exactly as in the case illustrated in FIGS. 1 to 3. However, when the release device has been cocked preliminary to hanging the load, i.e. when the hooks 9, 10 are in their retaining position, the load can be put in position by simply hoisting it on the site, for the two arms 38, 39 can in this case pivot in opposite directions and away from each other, against the force of spring 42, so as to clear the beaks 7, 8 of hooks 9, 10 and eventually be supported by these hooks.

The exemplary forms of embodiment of the invention which are described hereinabove and illustrated in the drawing should not be construed as limiting the scope of the invention and therefore many modifications and constructional variations may be contemplated without departing from the basic principles of the invention as disclosed in the follwing claims. What we claim is:

1. A device, for supporting a load from a carrier so as to be jettisonable by each two separate manners of operation of the device, comprising:
   (i) a suspension member for securing to the load
   (ii) a two-arm rocker mounted pivotably intermediate its ends on said suspension member
   (iii) a first support member for mounting pivotably on said carrier, said first support member having a first position in which it is engaged under one of the arms of said rocker, and a second position in which it is disengaged from said one arm
   (iv) a first control means connected to said first support member and serving (a) for movement of said first support member into its first and second positions, and (b) for locking said first support member releasably in its first position
   (v) a second support member for mounting pivotably on said carrier, said second support member having a first position in which it is engaged under the other of the arms of said rocker, and a second position in which it is disengaged from said other arm
   (vi) a second control means connected to said second support member and serving for (a) movement of said second support member into its first and second positions, and (b) for locking said second support member releasably in its first position,
   whereby, when said first and second support members are both in their first position engaged under a respective arm of the rocker, movement of either of said support members by its respective control means to its respective second positon permits said rocker to pivot under the weight of the load and thereby release the load from the carrier.

2. A device, as claimed in claim 1, wherein said rocker comprises first and second portions each pivotable on said suspension member and each including a respective one of the two arms of the rocker, said first and second portions being urged into abutment by resilient loading means, said first and second portions being relatively pivotable, against the action of said resilient loading means, out of their condition of abutment for escapement of their respective arms past the respective support members during raising of said rocker into engagement with the support members in first position.

3. A device, for supporting a load from a carrier so as to be jettisonable by each of two separate manners of operation of the device, comprising:
   (i) a suspension member, for securing to the load, including an at least part-spherical retaining member,
   (ii) a first support member for mounting movably on said carrier and having a first position in which it is engaged with said retaining member, and a second position in which it is disengaged from said retaining member,
   (iii) a first control means connected to said first support member and serving (a) for movement of said first support member into its first and second positions and (b) for locking said first support member releasably in its first position,
   (iv) a second support member for mounting movably on said carrier and having a first position in which it is engaged with said retaining member, and a second position in which it is disengaged from said retaining member,
   (v) a second control means connected to said second support member and serving (a) for movement of said second support member into its first and second positions, and (b) for locking said second support member releasably in its first position,
   whereby, when said first and second support members are both in their first position engaged with said retaining member, movement of either of said support members by its respective control means to its respective second position permits said retaining member to become disengaged from the other support member under the weight of the load and thereby release the load from the carrier.

4. A device, as claimed in claim 3, wherein said first and second support members are pivoted hooks adapted to engage with the lower part of said at least part-spherical retaining member.

5. A device, as claimed in claim 3, wherein said first and second support members are elements movable radially with respect to said at least part-spherical face presented towards and adapted to engage with said retaining member.

* * * * *